Oct. 15, 1957 O. E. HILL Re. 24,378

MULTIPLE WHEEL GRINDING MACHINE

Original Filed May 29, 1953 4 Sheets-Sheet 1

INVENTOR.
OIVA E. HILL

BY
Harold W. Eaton
ATTORNEY

MULTIPLE WHEEL GRINDING MACHINE

Original Filed May 29, 1953 4 Sheets-Sheet 2

INVENTOR.
OIVA E. HILL
BY
Harold W. Eaton
ATTORNEY

MULTIPLE WHEEL GRINDING MACHINE

Original Filed May 29, 1953 4 Sheets-Sheet 3

Filed May 29, 1953 4 Sheets-Sheet 3

INVENTOR.
OIVA E. HILL
BY
Harold W. Eaton
ATTORNEY

MULTIPLE WHEEL GRINDING MACHINE

Original Filed May 29, 1953 4 Sheets-Sheet 4

United States Patent Office

Re. 24,378
Reissued Oct. 15, 1957

24,378

MULTIPLE WHEEL GRINDING MACHINE

Oiva E. Hill, West Boylston, Mass., assignor to Norton Company, Worcester, Mass., a corporation of Massachusetts Original No. 2,720,063, dated October 11, 1955, Serial No. 358,337, May 29, 1953. Application for reissue June 10, 1957, Serial No. 670,356

13 Claims. (Cl. 51—165)

Matter enclosed in heavy brackets [ ] appears in the original patent but forms no part of this reissue specification; matter printed in italics indicates the additions made by reissue.

The invention relates to grinding machines, and more particularly to a cylindrical-type multiple wheel grinding machine.

One object of the invention is to provide a simple and thoroughly practical multiple wheel grinding machine for simultaneously grinding a plurality of spaced cylindrical portions on a work piece. Another object is to provide a multiple wheel truing apparatus for simultaneously truing a plurality of spaced grinding wheels. Another object is to provide a feed compensating mechanism simultaneously to advance a plurality of truing tools and to impart a compensating adjustment to the wheel feeding mechanism so that grinding may be resumed after a truing operation without the necessity of resetting the wheel feeding mechanism. Another object of the invention is to provide an independent truing tool feeding mechanism whereby each of the truing tools may be incrementally adjusted to compensate for wheel wear caused by grinding or diamond wheel wear caused by truing operations. Another object is to provide a hydraulically operated feeding mechanism on each of a plurality of truing tool units which may be remotely controlled from the control station for independently imparting a compensating adjustment to each of the truing tools as desired. A further object of the invention is to provide a truing apparatus including a plurality of truing tool units each of which is provided with a truing tool slide movable toward and from the grinding wheel axis as controlled by a forming bar and a follower during a longitudinal traversing movement of the truing tool units.

Other objects will be readily apparent from the foregoing disclosure.

One embodiment of the invention has been illustrated in the drawings in which.

Figure 1:
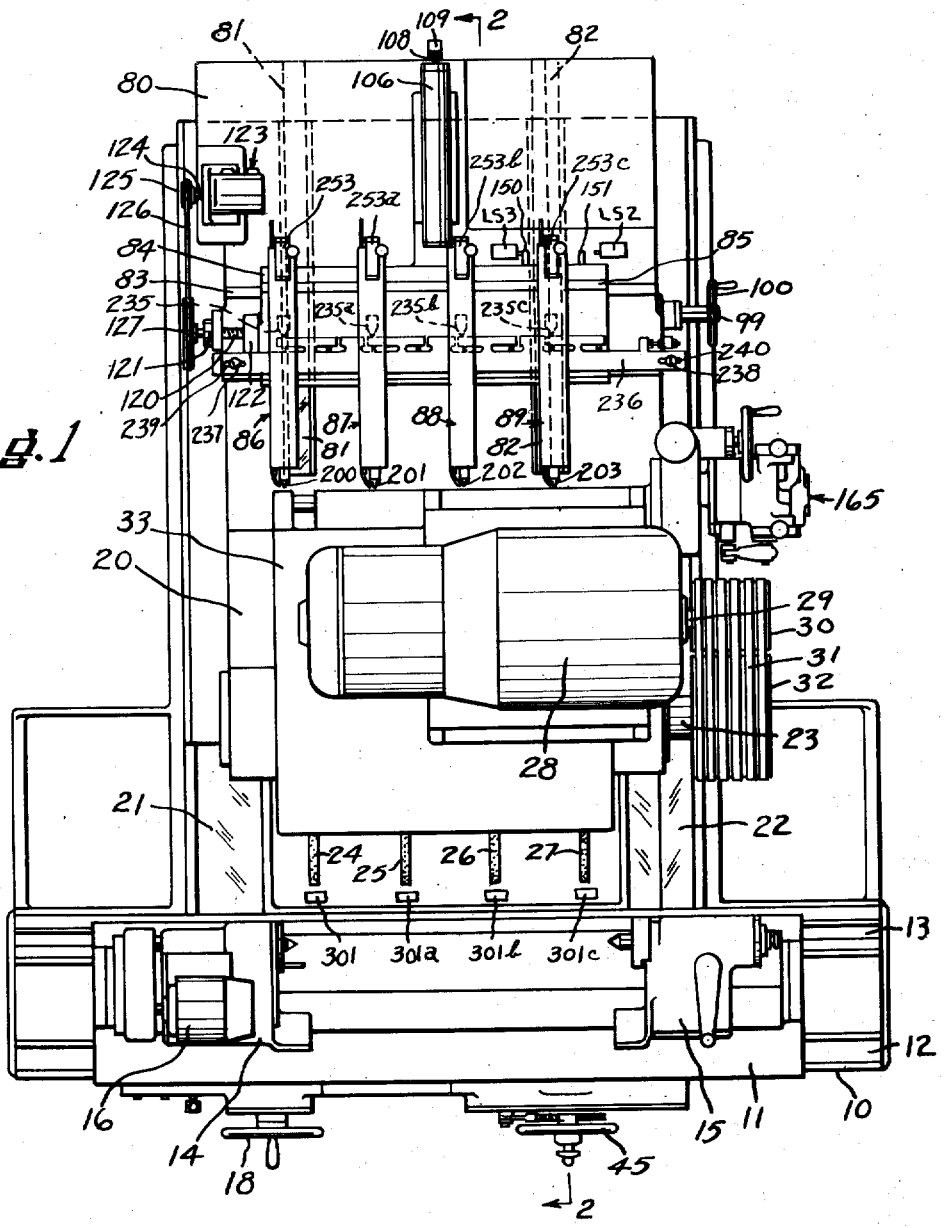
Fig. 1 is a plan view of the improved multiple wheel grinding machine.

An improved multiple wheel grinding machine has been illustrated in the drawings comprising a base 10 having a longitudinally movable work table 11 slidably supported on a flatway 12 and a V-way 13 formed on the upper surface of the base 10. The table 11 serves as a support for a motor driven headstock 14 and a footstock 15 for rotatably supporting a work piece to be ground. The headstock 14 may be driven by an electric motor 16 mounted on the upper surface thereof.

A manually operable traverse mechanism may be provided which may be of the old and well known type such as, for example, that shown in the expired U. S. patent to C. H. Norton No. 762,838 dated June 14, 1904, to which reference may be had for disclosures not contained herein. A manually operable traverse wheel 18 is mounted on the front of the machine base for actuating the traversing mechanism (not shown) to position the table 11 longitudinally relative to the base 10.

The base 10 also serves as a support for a transversely movable wheel slide 20 supported on a flat way 21 and a V-way 22. The wheel slide 20 rotatably supports a wheel spindle 23 in suitable journalled bearings (not shown). The wheel spindle 21 is arranged to support a plurality of spaced grinding wheels 24, 25, 26 and 27. A driving mechanism is provided for the wheel spindle 23 comprising an electric motor 28 mounted on the upper surface of a wheel guard 33. The motor 28 is provided with a motor shaft 29 supporting a multiple V-groove pulley 30 which is connected by multiple V-belts 31 with a multiple V-groove pulley 32 mounted on the right hand end of the wheel spindle 23 (Fig. 1).

A suitable feeding mechanism is provided for feeding the wheel slide 20 transversely relative to the base. This mechanism may comprise a rotatable feed screw 35 which meshes with or engages a feed nut 36. The feed nut 36 is rotatably journalled in a pair of spaced anti-friction bearings 37 and 38 which are supported by a housing 39 depending from the under side of the wheel slide 20. The right hand end of the feed screws 35 (Fig. 2) is rotatably supported by a slidably mounted sleeve 40 which is journalled in a cylindrical aperture 41 formed in the base 10. The left hand end of the feed screw 35 is provided with an integral reduced cylindrical portion 42 which is slidably keyed in a rotatable sleeve 43. The sleeve 43 is journalled in an anti-friction bearing 44 supported by the base 10.

A manually operable feeding mechanism is provided for actuating the feed screw 35 to cause a transverse feeding movement of the wheel slide 20. This mechanism may comprise a rotatable feed wheel 45 located on the front of the machine base 10. The feed wheel 45 is arranged to rotate a gear 46 meshing with a gear 47 which is mounted on a rotatable shaft 48. The shaft 48 also supports a gear 49 meshing with a gear 50 rotatably mounted on a shaft 51. The gear 50 meshes with a gear 52 mounted on the left hand end of a rotatable shaft 53, the right hand end of which is slidably keyed within the sleeve 43. It will be readily apparent from the foregoing disclosure that a rotary motion of the feed wheel 45 will be transmitted through the gear mechanism above described to impart a rotary motion to the feed screw 35 thereby transmitting a transverse feeding movement to the wheel slide 20 and the grinding wheels 24, 25, 26 and 27. The direction of rotation of the feed wheel 45 serves to determine the direction of transverse movement of the wheel slide 20.

In order to cause a rapid transverse positioning movement of the wheel slide 20 relative to the base 10, a hydraulically operated mechanism is provided comprising a fluid pressure cylinder 55 which contains a slidably mounted piston 56. The piston 56 is connected to the right hand end of a piston rod 57, the left hand end of which is operatively connected to the sleeve 40. When fluid under pressure is passed into a cylinder chamber 58, the piston 56 together with the feed screw 35 will be moved rapidly toward the left to impart a corresponding movement to the wheel slide 20 and the grinding wheel 21. During this movement, fluid is exhausted from the cylinder chamber 59. A feed control valve 60 (Fig. 8) is provided for controlling the admission to and exhaust of fluid under pressure from the cylinder 55.

Figure 2:
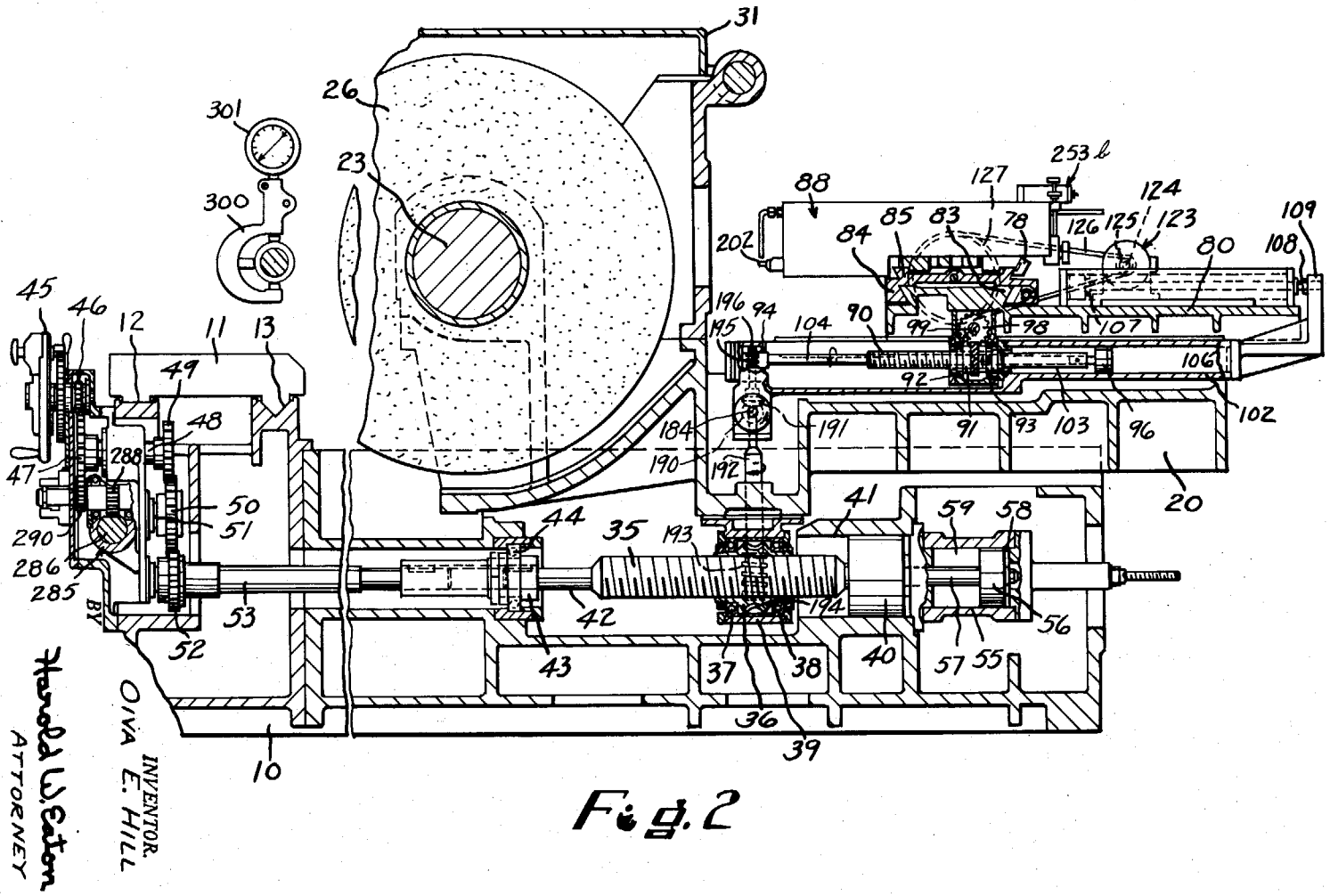
Fig. 2 is a vertical sectional view, on an enlarged scale, taken approximately on the line 2—2 of Fig. 1, through the wheel feeding and truing mechanism.

A grinding wheel feeding mechanism may be provided for imparting a slow rotary motion to the feed screw 35 in a manner substantially identical with that shown in my copending application Ser. No. 259,372 filed December 1, 1951, U. S. Patent No. 2,648,171 dated August 11, 1953, to which reference may be had for details of disclosure not contained herein. This mechanism may comprise a cylinder 285 (Fig. 8) which contains a slidably mounted piston 286. The piston 286 is provided with rack teeth 287 which mesh with a gear 288 mounted on a shaft 289. The shaft 289 also supports a gear 290 which meshes with the gear 47 (Fig. 2). When fluid under pressure is passed through a pipe 291 into the left hand end of the cylinder 285, the piston 286 will move toward the right to impart a rotary motion to the feed screw 35 so as to cause a forward feeding movement of the wheel slide 20. During this movement of the piston 286 fluid may exhaust from the chamber at the right hand end of the cylinder 285 through a pipe 292. The feed control valve 60 serves to simultaneously control the passage of fluid under pressure to both the cylinder 55 and the cylinder 285. A manually operable rotary-type valve 293 is provided for rendering the grinding wheel feed cylinder 285 inoperative when desired. The valve 293 is actuated by a lever 294. When the lever 294 is shifted in a counter-clockwise direction into broken line position 294a, the valve rotor is turned so that fluid under pressure from the pressure pipe 68 passes through the valve 293 and through a pipe 295 to actuate a fluid pressure actuated by-pass valve 296. When pressure is passed through the pipe 295 to shift the valve 296 to a left hand end position fluid under pressure is cut-off from the cylinder 285 and fluid may then by-pass between opposite ends of the cylinder 285 to facilitate a manual feeding of the grinding wheel slide 20 by rotation of the feed wheel 45.

The control valve 60 is normally held in a right hand end position by a spring 61. A solenoid S7 (Fig. 8) is provided which when energized serves to pass fluid under pressure to start a rapid movement of the piston 56 toward the left to cause a rapid approaching movement of the grinding wheel slide 20, and at the same time to pass fluid to the left hand end of the cylinder 285 to cause a slow movement of the piston 286 to impart a slow rotary motion to the feed screw so as to advance the wheel slide 20 at a grinding speed.

The solenoid S7 is preferably controlled from the control station at the front of the machine by means of an electrical control apparatus comprising a pivotally mounted lever 295 pivoted on a stud 296. When the lever 295 is rocked in a clockwise direction (Fig. 8) it closes a start switch 297 to energize an electric timer 298. The timer 298 may be any of the well known commercial timers, such as, for example a Microflex timer manufactured by the Signal Electric Corp. of Moline, Illinois. When the timer 298 is energized a circuit is made to energize the solenoid S7 thereby starting a rapid approaching movement of the grinding wheel and a slow feeding movement thereof in a manner above described. After a predetermined time interval has elapsed, the electric timer times out thereby breaking a circuit to deenergize the solenoid S7 so that the wheel slide is moved rapidly to a rearward or inoperative position and at the same time the feed screw 35 is rotated in the reverse direction so as to reset for the next grinding operation. A stop switch 299 is provided to facilitate stopping the grinding cycle at any time during a grinding operation if desired. If it is desred to stop a grinding cycle, the lever 295 may be rocked in a counter-clockwise direction to actuate the stop switch 299 thereby breaking a circuit to deenergize the solenoid S7 and also to allow the timer 298 to reset.

A hydraulic system is provided comprising a motor driven fluid pump 65 for supplying fluid under pressure to the various actuating mechanisms of the machine. The pump 65 draws fluid through a pipe 66 from a reservoir 67 and forces fluid under pressure through a pipe 68 to the various mechanisms of the machine to be hereinafter described. A relief valve 69 is connected in the pipe line 68 for returning excess fluid under pressure to the reservoir 67 to facilitate maintaining a predetermined pressure in the hydraulic system. A start switch 70 is provided for controlling the starting and stopping of the pump driving motor. When the start switch 70 is closed, a relay switch 71 is energized to start the pump driving motor. The relay switch 71 sets up a holding circuit to maintain the motor in a running condition after the push button switch 70 is released. A stop switch 72 is provided for breaking the circuit so as to stop the pump 65 when desired.

Figure 4:
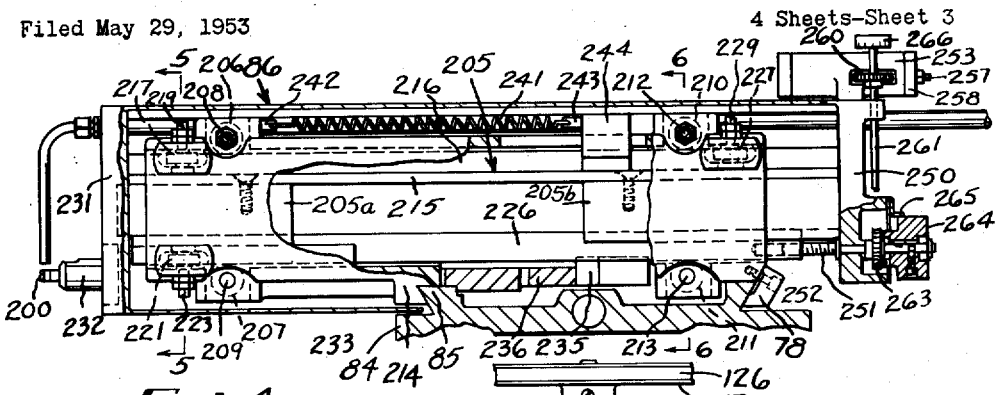
Figure 4 is a fragmentary sectional view, taken approximately on the line 4—4 of Fig. 3, showing a truing tool unit in elevation with parts broken away and shown in section.

A multiple wheel truing apparatus is provided whereby all of the grinding wheels may be simultaneously trued by means of a manually initiated cycle. This mechanism may comprise a cross slide 80 which is supported on a flat way 81 and a V-way 82 formed on an upper surface of the wheel slide 20. The cross slide 80 is provided with a longitudinally extending dovetailed slideway 83 for guiding a longitudinally traversable slide 84. The slide 84 is provided with a dovetailed slideway 85 to which a plurality of truing tool units 86, 87, 88 and 89 may be clamped in spaced adjusted positions thereon. Each of the truing tool units 86, 87, 88 and 89 are provided with a clamping block 78 to facilitate clamping the units in adjusted position of the dovetail slideway 85 (Fig. 4).

A suitable feeding mechanism is provided for adjusting the cross slide 80 toward and from the wheel spindle 23. This mechanism may comprise a feed screw 90 which meshes with or engages a rotatable feed nut 91 journalled in anti-friction bearings 92 and 93. A shaft 104 is slidably keyed within the feed screw 90. The left hand end of the shaft 104 is rotatably supported in an anti-friction bearing 94 at its left hand end which serves to hold the shaft 104 against an axial movement. The right hand end of the feed screw 90 is journalled in anti-friction bearings 95 supported within a piston 96. The nut 91 is provided with a spiral gear 97 which meshes with a spiral gear 98 which is keyed onto a rotatable shaft 99. The other end of the shaft 99 is provided with a manually operable hand wheel 100. By rotation of the hand wheel 100, a rotary motion may be imparted through the mechanism just described to rotate the feed nut 91 thereby causing a transverse movement of the cross slide 80.

Figure 8:
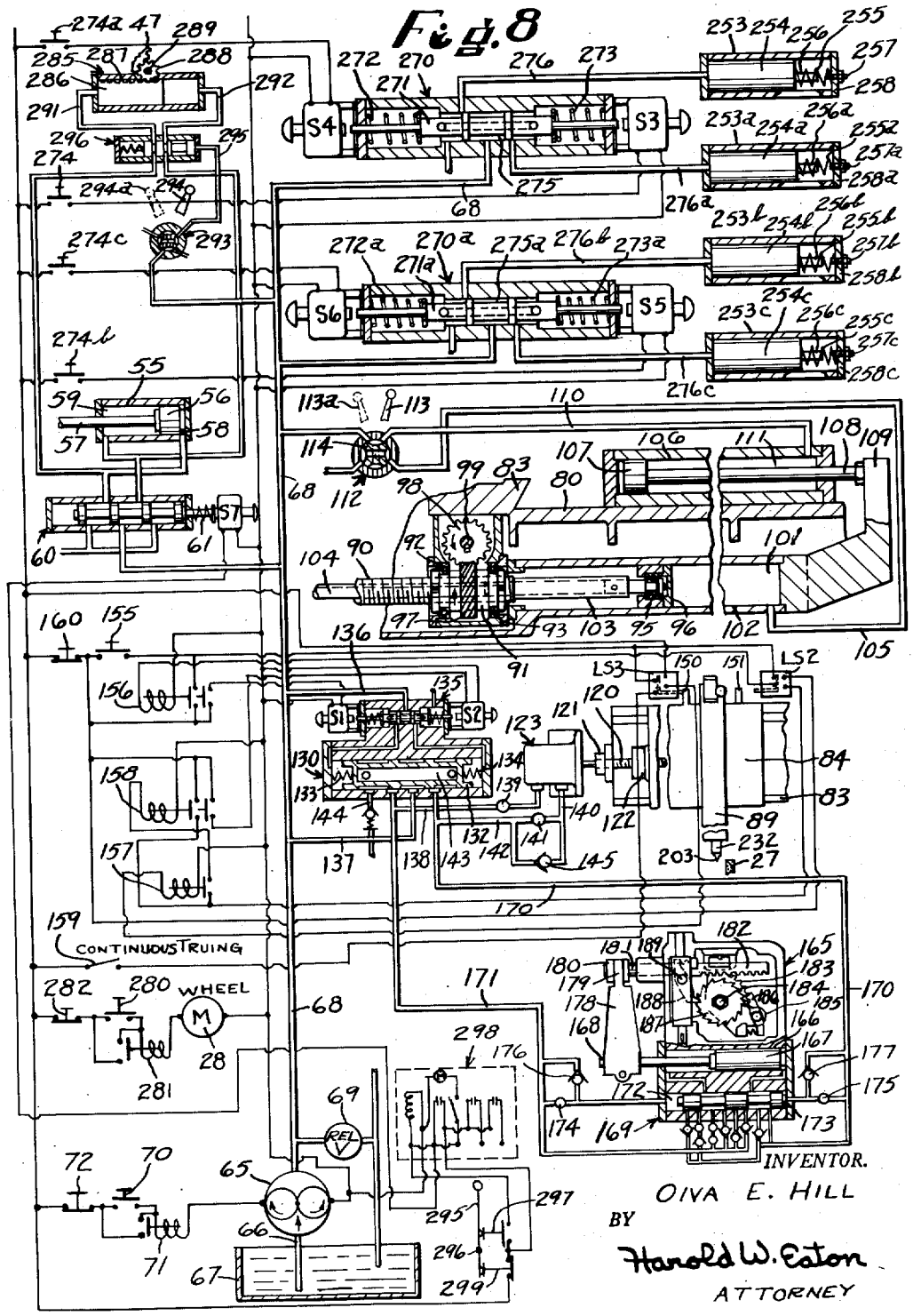
Fig. 8 is a combined electric and hydraulic diagram of the actuating mechanisms and the controls therefor.

In order to cause a rapid positioning movement of the cross slide 80 a hydraulically operated mechanism is provided comprising the piston 96 which is slidably mounted within a cylinder 102. The cylinder 102 is fixedly mounted relative to the wheel slide 20. The right hand end of the feed screw 90 is formed as a piston rod 103. The feed screw 90 may be moved in an axial direction by the piston 96 or may be rotated in a manner to be hereinafter described for imparting motion to the cross slide 80. When fluid under pressure is passed through a pipe 105 into a cylinder chamber 101, the piston 96 will be moved toward the left (Figs. 2 and 8) to impart a corresponding positioning movement to the cross slide 80 so as to move the truing tool units 86, 87, 88 and 89 into an operative position. In the preferred form a separate independent hydraulic mechanism is provided for moving the cross slide 80 rearwardly to an inoperative position. This mechanism may comprise a cylinder 106 which is fixedly mounted on the cross slide 80. The cylinder 106 contains a slidably mounted piston 107 which is connected to one end of a piston rod 108. The right hand end of the piston rod 108 is fixedly mounted to a bracket 109 which in turn is fixedly mounted relative to the wheel slide 20. When fluid under pressure is passed through a pipe 110 into a cylinder chamber 111, the piston 107, being anchored, the cylinder 106 moves toward the right (Figs. 2 and 8) to cause a rapid rearward movement of the cross slide 80. A manually operable rotary-type valve 112 is provided for controlling the admission to and exhaust of fluid from the cylinders 102 and 106. The valve 112 is provided with a manually operable lever 113 by means of which a valve rotor 114 may be shifted to reverse the flow of fluid when desired. As illustrated in Fig. 8 fluid under pressure from the pipe 68 passes through the valve 112 and through the pipe 110 into the cylinder chamber 111 to move the cross slide 80 into a rearward or inoperative position and to hold it in this position. When it is desired to effect a truing operation, the lever 113 may be rocked in a counter-clockwise direction into the broken line position 113a (Fig. 8) so that fluid under pressure from the pipe 68 will pass through the pipe 105 to cause a forward movement of the cross slide 80.

A power operated traversing mechanism is provided for traversing the truing tool slide 84 longitudinally in either direction. This mechansm may comprise a feed screw 120 which is rotatably journalled in a bearing 121 fixedly mounted on the cross slide 80. This feed screw 120 meshes with or engages a nut 122 mounted on the left hand end of the slide 84 (Fig. 8). A rotary-type fluid motor 123 is provided for actuating the feed screw 120. The fluid motor 123 is mounted on the cross slide 80. The motor 123 is provided with a rotor shaft 124 having a V-groove pulley 125 which is connected by a V-belt 126 with a V-groove pulley 127 mounted on the left hand end of the feed screw 120. It will be readily apparent from the foregoing disclosure that rotation of the motor shaft 124 will be imparted through the driving mechanism above described to rotate the feed screw 120 and thereby impart a longitudinal traversing movement to the slide 84. As shown diagrammatically in Fig. 8, the fluid motor 123 is connected directly to the feed screw 120.

A solenoid actuated control valve 130 is provided for controlling the admission to and exhaust of fluid from the fluid motor 123. The valve 130 is a piston-type valve having a slidably mounted valve member 132 which is normally held in a central position by a pair of opposed balanced springs 133 and 134. A pilot valve 135 is provided for controlling the shifting movement of the valve member 132 in either direction. A pair of solenoids S1 and S2 are provided for controlling the shifting movement of the pilot valve 135 in either direction. When the solenoid S2 is energized, the pilot valve 135 is shifted toward the left (Fig. 8) so that fluid under pressure in the pressure pipe 68 may pass through a pipe 136, through the pilot valve 135, through a passage to the right hand end chamber of the valve 130 to move the valve member 132 toward the left so that fluid under pressure from the pressure pipe 68 may pass through a pipe 137, through the valve 130, through a pipe 138, through a throttle valve 139 to the fluid motor 123 so as to rotate the feed screw 120 to traverse the slide 84 toward the left. During this actuation of the motor 123, fluid may exhaust from the motor through a pipe 140, through a throttle valve 141, through a pipe 142, through a central passage 143 in the valve member 132 and out through an exhaust pipe 144 into the reservoir 67. A ball check valve 145 is provided so that when fluid under pressure is reversed and passed through the pipe 142, fluid may bypass the throttle valve 141 by passing through the ball check valve 145.

When the solenoid S1 is energized, the pilot valve 135 is shifted toward the right (Fig. 8) to pass fluid under pressure into the left hand end chamber of the valve 130 so as to shift the valve member 132 toward the right so that fluid under pressure from the pipe 137 passes through the valve 130, through the pipe 142, the throttle valve 141, the ball check valve 145 and through the pipe 140 to the motor 123 to rotate the shaft thereof and the feed screw 120 in the opposite direction so as to traverse the slide 84 longitudinally toward the right. The throttle valves 139 and 141 are provided to facilitate independently adjusting the speed of the motor 123 in either direction.

It is desirable to automatically control the energization of the solenoids S1 and S2 so that the slide 84 may be reciprocated through one or more strokes automatically. As illustrated in Fig. 8, a pair of spaced lugs 150 and 151 are provided on the rear surface of the slide 84. These lugs 150 and 151 are arranged to actuate a pair of limit switches LS2 and LS3 respectively which are operatively connected so as to energize either the solenoid S1 or the solenoid S2.

In order to start a truing cycle, a manually operable push button switch 155 is provided which when closed serves through the normally closed contact of the limit switch LS2 to energize a relay switch 156. The push button switch 155 is a momentary contact switch and the relay switch 156 is provided with a holding circuit to hold the circuit closed after the push button siwtch 155 is released. The energizing of the relay switch 156 serves to close a circuit to energize the solenoid S1 thereby shifting the valve member 132 toward the right so as to pass fluid under pressure through the pipe 132 and the throttle valve 141 to the motor 123 to rotate the feed screw 120 so as to cause the slide 84 to traverse toward the right. The traversing movement of the slide 84 toward the right continues until the lug 151 engages the actuating plunger of the limit switch LS2 thereby breaking the holding circuit to the relay switch 156 thus deenergizes the solenoid S1. The normally open contacts of the limit switch LS2 then close. When the lug 150 moves away from the limit switch LS3, the normally closed contacts of the limit switch LS3, that is, the right hand contacts of limit switch LS3 (Fig. 8) close to energize a relay switch 157 which in turn closes a circuit to energize a relay switch 158. The relay switch 158 is provided with a holding circuit so that when the relay switch 157 becomes deenergized the relay switch 158 will be maintained energized. The energization of the relay switch 158 closes a circuit to energize the solenoid S2 thereby shifting the pilot valve 135 toward the left so that fluid under pressure is passed to the right hand end chamber of the valve 130 to shift the valve member 132 toward the left so that fluid under pressure is passed through the pipe 138, through the throttle valve 139 to the motor 123 to rotate the feed screw 120 in the opposite direction thereby traversing the slide 84 longitudinally in the opposite direction, namely toward the left. As soon as the lug 150 on the slide 84 engages and actuates the limit switch LS3, the right hand contacts thereof are opened thus breaking a circuit to deenergize the relay switch 157 which in turn deenergizes the relay switch 158 and the slide 84 is stopped after one complete reciprocation. If a continuous truing operating is desired, that is, more than one complete reciprocation of the slide 84, a continuous truing switch 159 is closed. In case the switch 159 is closed, when the lug 150 actuates the limit switch LS3 to close the left hand contacts thereon, a circuit is set up to again energize the relay switch 156 to start a second reciprocation of the longitudinally movable slide 84. The slide 84 will be continuously reciprocated as long as the switch 159 remains closed. A stop switch 160 is connected in series with the start switch 155 so that the movement of the truing tool slide 84 may be stopped at any time desired.

In order to facilitate truing the grinding wheel a predeterminal amount at each pass of the longitudinally movable slide 84, it is desirable to provide an automatic compensator 165 which is arranged automatically to rotate the feed screw 90 by a predetermined increment to advance the cross slide 80 and at the same time to rotate the wheel feed nut 36 relative to the feed screw 35 to compensate for the reduction in size of the grinding wheels caused by the truing operating, so that after a truing operation grinding may be resumed without the necessity of resetting the wheel feeding mechanism.

The feed compensator 165 may comprise a fluid motor including a cylinder 166 containing a slidably mounted piston 167 which is fixedly connected to one end of a piston rod 168. A piston-type control valve 169 is provided for controlling the reciprocatory movement of the piston 167. This motor is identical with that disclosed in the prior U. S. Patent No. 2,522,481 to D. W. Martin dated September 12, 1950, and the compensator as a unit is substantially the same as that shown in the prior U. S. Patent No. 2,522,485 to H. A. Silven and C. G. Flygare dated September 12, 1950, to which reference may be had for details of disclosure not contained herein. A pipe 170 connects the pipe 142 with the compensator 165 and a pipe 171 connects the pipe 138 with the compensator 165 so that when fluid under pressure is passed through either the pipe 142 or the pipe 138 to cause a longitudinal traversing movement of the truing tool slide 84, fluid is also passed to the feed compensator 165 to advance the cross slide 80 at the start of each longitudinal movement of the slide 84 and also to advance the wheel slide 20 by an equal amount. The control valve 169 is shifted by the admission of fluid under pressure to either the end chamber 172 or the end chamber 173. The shifting movement of the valve 169 is controlled by throttle valves 174 and 175. Ball check valves 176 and 177 allow fluid to bypass the throttle valves 174 or 175 on the pressure side of the system. The motor being identical with the disclosure in the prior patents above referred to, reference may be had thereto for disclosures not contained herein. During each longitudinal movement of the control valve 169, the piston 167 makes one complete reciprocation.

The piston rod 168 is provided with an arm 178, the upper end of which is provided with a yoke 179 which slides within a groove formed in a collar 180 mounted on the left hand end of a slide rod 181. The slide rod 181 is provided with a rack bar 182 which meshes with a gear segment 183. The gear segment 183 is rotatably supported on a shaft 184. The gear segment 183 is provided with a projecting lug 185 which carries a pivotally mounted spring pressed pawl 186. The pawl 186 is arranged to engage a ratchet wheel 187 keyed on the end of the shaft 184. A spring pressed holding pawl 188 is mounted on a fixed stud 189 to prevent clockwise movement of the ratchet wheel 187. It will be readily apparent from the foregoing disclosure that during each reciprocation of the piston 167, the slide rod 181 will be reciprocated through a similar stroke to oscillate the gear segment 183. During the clockwise movement of the gear segment 183, the feed pawl 186 rides idly over the teeth of the ratchet wheel 187. During the return counter-clockwise movement of the gear segment 183, the feed pawl 186 imparts a rotary motion to the ratchet wheel 187.

The shaft 184 is operatively connected simultaneously to impart a compensating adjustment to the wheel feeding mechanism and also to the truing tool feeding mechanism. The shaft 184 is provided with a bevel gear 190 which meshes with a bevel gear 191 (Fig. 2) mounted on a vertically arranged rotatable shaft 192. A worm 193 is mounted on the lower end of the shaft 192 and meshes with a worm gear 194 formed on the periphery of the feed nut 36. A worm 195 is mounted on the upper end of the shaft 192 and meshes with a worm gear 196 mounted on the left hand end of the shaft 104. It will be readily apparent from the foregoing disclosure that a compensating rotation of the shaft 184 by the feed compensator 165 will be imparted to provide a compensating adjustment of the wheel slide 20 and also a rotation of the feed screw 90 to advance the truing tool for a truing operation. By advancing the wheel slide by an amount equal to the infeed of the truing tool, grinding may be resumed after a truing operation without the necessity of resetting the wheel feeding mechanism. This latter is due to the fact that the compensating adjustment is made by rotation of the feed nut 36 relative to the stationary feed screw 35.

As above explained the truing tool units 86, 87, 88 and 89 are each formed with dovetailed slide surfaces which mate with the dovetailed surface 85 formed on the longitudinally multiple slide 84. This arrangement facilitates setting up the machine and providing means for positioning the units along the slide 84 to correspond with the spacing of the grinding wheels 24, 25, 26 and 27 respectively. Each of the truing tool units 86, 87, 88 and 89 are provided with a diamond or truing tool 200, 201, 202 and 203 respectively which are mounted in a manner to be hereinafter described. The truing tool units are arranged on the slide 84 so that they may be traversed or reciprocated in a direction parallel to the axis of the grinding wheel spindle 23 simultaneously to true the peripheral surfaces of all of the grinding wheels.

Figure 3:
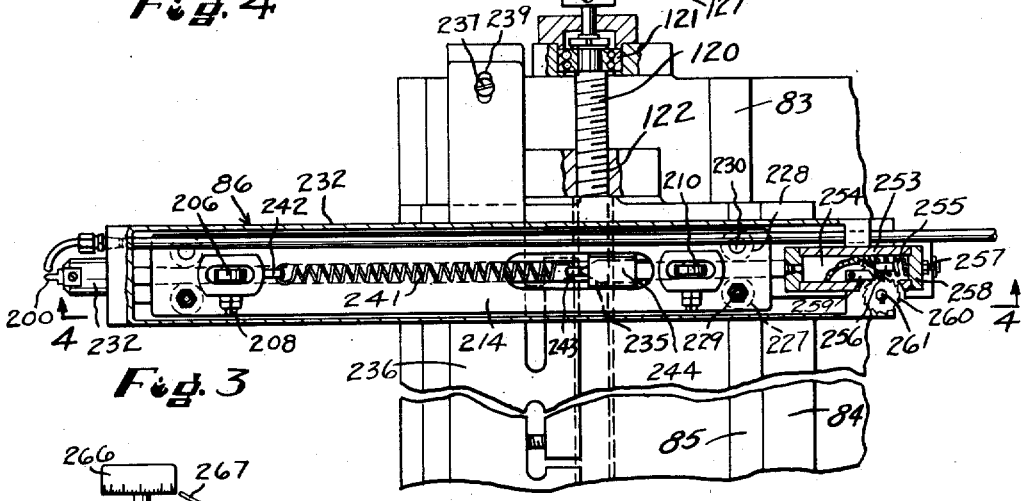
Fig. 3 is a horizontal sectional view on an enlarged scale, through one of the wheel truing units, showing the forming bar and the traversing mechanism for the truing apparatus slide.

Each of the truing tool units 86, 87, 88 and 89 are identical in construction, consequently only the truing tool unit 86 will be described in detail. The truing tool unit 86 is provided with a truing tool slide 205 which is mounted on a roller support to provide a free movement thereof during truing operation. As illustrated in Figs. 3 and 4, a pair of rollers 206 and 207 are mounted on studs 208 and 209 respectively. These rollers engage upper and lower surfaces formed on the slide 205. A second pair of rollers 210 and 211 are mounted on studs 212 and 213 and are arranged to engage upper and lower surfaces on the slide 205 adjacent to the rear end thereof. These studs are all supported on a frame 214 of the unit 86.

Figure 5:
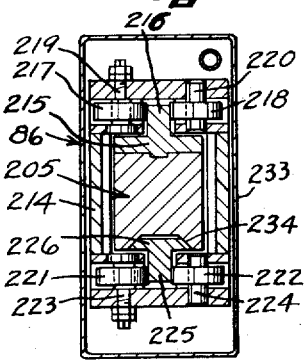
Fig. 5 is a vertical sectional view, on an enlarged scale, taken approximately on the line 5—5 of Fig. 4, through one of the sets of roller supports for one of the truing tool carriers.
Figure 6:
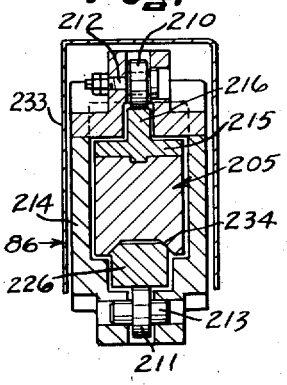
Fig. 6 is a vertical sectional view, on an enlarged scale, taken approximately on the line 6—6 of Fig. 4, through one of the roller supports for a truing tool carrier.

As illustrated in Figs. 5 and 6 the slide 205 is formed in two parts the upper part of which is substantially a T-shaped bar 215 having an upwardly extending rib 216, the upper surface of which is engaged by the rollers 206 and 210. The rollers 206, 207, 210 and 211 serve to form a sliding support to guide the slide 205 in a vertical plane.

Additional roller supports are provided for laterally guiding the slide 205 comprising a pair of rollers 217 and 218 mounted on a pair of studs 219 and 220, the studs 219 and 220 being mounted on the frame 214. The rollers 217 and 218 are arranged to engage opposite side faces of the rib 216. The right hand end of the slide 205 (Figs. 3 and 4) is guided by a pair of spaced rollers 227 and 228 which engage opposite sides of the rib 216. The rollers 227 and 228 are supported by a pair of studs 229 and 230 respectively. A slide bar 226 slidably engages a V-way 234 formed on the under side of the slide 205. The left hand end of the slide bar 226 is provided with a slabbed-off portion forming a downwardly extending rib 225. The opposite side faces of the rib 225 are engaged by a pair of rollers 221 and 222 mounted on a pair of studs 223 and 224 which are carried by the frame 214. The forward end of the slide 205 is provided with a verticaly arranged head 231 (Fig. 4) which supports a truing tool holder 232. A sheet metal casing 233 surrounds most of the truing tool unit 86 and is fastened to the head 231 so that it moves with the slide 205. The slide bar 226 is engaged by the rollers 207 and 211. The slide 205 (Fig. 4) comprises the spaced parallel bars 215 and 226 which are spaced from each other by blocks 205a and 205b. The bar 215 is fixedly mounted to the upper surfaces of the blocks 205a and 205b. The bar 226 is adjustably mounted relative to the blocks 205a and 205b as will be hereinafter described.

The slide bar 226 serves as a support for the follower 235 which rides along the face of a forming bar 236. The forming bar 236 extends across the upper surface of the longitudinally movable slide 84 and is fastened at its opposite ends with adjustable clamping screws 237 and 238 to the cross slide 80. These screws 237 and 238 pass through elongated slots 239 and 240 respectively and are screw threaded into the cross slide 80. The elongated slots 239 and 240 are provided to facilitate adjustment of the forming bar longitudinally in setting up the machine.

A tension spring 241 is provided for maintaining the follower 235 in operative engagement with the forming bar 236. One end of the spring 241 is fastened to a stud 242 fixedly mounted on the frame 214 (Fig. 4). The other end of the spring 241 is fastened to a stud 243 which is carried by an upwardly extending lug 244 fixedly mounted on the slide 205. The tension of the spring 241 serves to maintain the follower 235 in operative engagement with the forming bar 236 during a longitudinal traversing movement of the slide 84. By using a follower 235 and a forming bar 236, a transverse movement of the truing tool slide 205 may be obtained during the longitudinal traversing movement to produce the desired shape on the operative face of the grinding wheel 24. All of the other truing units 87, 88 and 89 are identical in construction. Each of these latter truing tool units are provided with followers 235a, 235b and 235c respectively as illustrated in Fig. 1.

Figure 7:
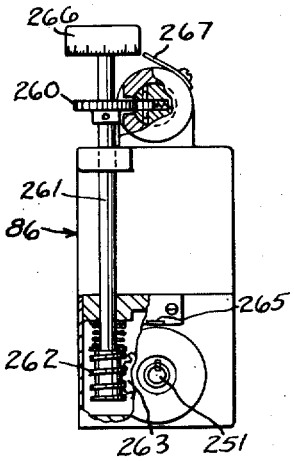
Fig. 7 is a rear elevation, on an enlarged scale, of one of the truing tool units having parts broken away and shown in section to show the feed compensating mechanism for the truing tool.

In a multiple wheel grinding operation where a plurality of spaced grinding wheels are employed simultaneously to grind spaced portions on a work piece, it is desirable to provide independent adjustments for each of the truing tools to compensate for variations in wheel wear and truing tool wear. This is preferably accomplished by providing a nut and screw adjustment between the truing slide 205 and the follower 235. As illustrated in Fig. 4, a bracket 250 is mounted on the right hand end of the slide 205. The bracket 250 serves as a support for a rotatable feed screw 251 which meshes with or engages a threaded aperture 252 formed at the bar 226. A hydraulically operated mechanism is provided for actuating the feed screw 251 which is arranged so that it may be remotely controlled from a control station on the front of the machine base. This mechanism may comprise a cylinder 253 fixedly mounted on the bracket 250. The cylinder 253 contains a slidably mounted piston 254 which is normally urged into a left hand end position by means of a compression spring 255 (Figs. 3 and 8). The right hand movement of the piston 254 is limited by a stud 256 fixedly mounted on the piston 254 moving into engagement with an adjustable stop screw 257 carried by a cylinder end cap 258. The piston 254 is provided with a pivotally mounted pawl 259 (Fig. 3) which is arranged to engage a ratchet wheel 260 to turn the same in a clockwise direction when the piston 254 is moved toward the right (Fig. 3). The ratchet wheel 260 is mounted on the upper end of a vertical shaft 261. A worm 262 mounted on the lower end of the shaft 261 (Fig. 7) meshes with a worm gear 263 which is rotatably supported on the feed screw shaft 251. A manually operable knob 264 is slidably keyed onto the right hand end of the feed screw shaft 251 (Fig. 4). The knob 264 is provided with clutch teeth which are arranged to engage clutch teeth formed on the right hand side face of the worm gear 263 (Fig. 4). It will be readily apparent that when desired the knob 264 may be moved toward the right to disengage the clutch teeth after which the feed screw 251 may be manually rotated to facilitate a manual adjustment of the truing tool 200 when desired in setting up the machine. An index finger 265 is fixedly mounted on the bracket 250 and serves to cooperate with a graduated scale on the periphery of the knob 264 to facilitate a manual adjustment thereof. A manually operable knob 266 is provided on the upper end of the shaft 261 to facilitate a fine manual adjustment of the feed screw 251 when the knob 264 is engaged with the worm gear 263. As shown in Fig. 7 an index finger 267 cooperates with a graduated scale on the periphery of the knob 266 to provide a calibrated adjustment of the truing tool 200 by manual rotation of the knob 266.

All of the other truing tool units 87, 88 and 89 are provided with an identical manual and hydraulically actuated adjusting mechanism as indicated in Fig. 1 by numerals 253a, 253b and 253c respectively.

In order to facilitate a remote control of the adjusting mechanism just described, a control valve 270 (Fig. 8) is provided for controlling the admisison to and exhaust of fluid from the cylinder 253. The valve 270 is a piston-type valve comprising a slidably mounted valve member 271 which is normally held in a central position by a pair of opposed compression springs 272 and 273. The valve member 271 is arranged so that it may be moved in either direction by a pair of solenoids S3 and S4. When it is desired to give the diamond or truing tool 200 a compensating adjustment, a push button switch 274 is closed to energize the solenoid S3 so as to shift the valve member 271 toward the left so that fluid under pressure from the pressure pipe 68 entering a valve chamber 275 may pass through a pipe 276 into a chamber formed at the left hand end of the cylinder 253 to move the piston 254 toward the right until the stud 256 moves into engagement with the stop screw 257. This movement of the piston serves in a manner above described to impart a rotary motion to the feed screw 251 so as to adjust the position of the follower 235 relative to the diamond or truing tool 200 by a predetermined increment.

Similarly, if it is desired to provide a compensating adjustment to the diamond or truing tool 201, a push button 274a is closed to energize the solenoid S4 thereby shifting the valve member 271 toward the right (Fig. 8) so that fluid under pressure entering the valve chamber 275 may pass through a pipe 276a into a chamber formed at the left hand end of the cylinder 253a thereby imparting a compensating adjustment to the truing tool 201.

A similar control valve 270a is provided for controlling the admission of fluid under pressure to the cylinders 253b and 253c so as to provide compensating adjustments for the truing tools 202 and 203 respectively. The control valve 270a is a piston-type valve having a slidably mounted valve member 271a which is normally held at a central position by a balanced compression spring 272a and 273a. The valve member 271a may be shifted in either direction by a pair of solenoids S5 and S6. When it is desired to impart a compensating adjustment to the truing tool 202, a push button switch 274b is closed to energize the solenoid S5 thereby shifting the valve member 271a toward the left so that the fluid under pressure entering a valve chamber 275a may pass through a pipe 276b into a cylinder chamber at the left hand end of the cylinder 253b to move the piston 254b toward the right thereby imparting a compensating adjustment to the truing tool 202 in a manner similar to that described above.

When it is desired to impart a compensating adjustment to the truing tool 203, a push button switch 274c is closed to energize the solenoid S6 so as to shift the valve member 271a toward the right so that fluid under pressure entering the valve chamber 275a may pass through a pipe 276c into a cylinder chamber formed at the left hand end of the cylinder 253c to move the piston 254c toward the right into engagement with a stop screw 257c thereby imparting a compensating adjustment to the truing tool 203 in a manner substantially the same as that previously described.

It will be readily apparent from the foregoing disclosure that by adjustment of the stop screws 257, 257a, 257b and 257c the increment of compensating adjustment for each of the truing tools 200, 201, 202 and 203 may be independently regulated.

In grinding a work piece having a plurality of spaced portions to be ground, the mechanisms above described are set up so that the truing tools when traversed simultaneously across the peripheries of the wheels 24, 25, 26 and 27 will true the wheels to the desired shape and diameter so that a transverse movement of the wheel slide 20 will simultaneously grind a spaced portion on a work piece rotatably supported between the headstock 14 and footstock 15 to the desired and predetermined sizes. If due to wheel wear or truing tool wear, it is necessary to provide a compensating adjustment for one or more of the truing tool units 86, 87, 88 or 89, this may be accomplished as above explained by manual manipulation of the push button switches 274, 274a, 274b and 274c.

As illustrated in Fig. 8, a control mechanism is provided for the wheel driving motor 28 comprising a push button start switch 280. The push button start switch 280 is connected to actuate a relay switch 281. The relay switch 281 is provided with a holding circuit to hold the circuit closed after the push button 280 is released. A stop switch 282 is provided to facilitate breaking the holding circuit and thereby stop the wheel driving motor 28 when desired.

In order that the operator may visibly indicate the progress of the grinding operation, a plurality of gaging devices are provided for visibly indicating the size of each portion of the work piece being ground. As illustrated in Fig. 2, a caliper-type gage 300 is provided having a dial indicator 301 which indicates work size. As indicated in Fig. 1 a plurality of dial gages 301, 301a, 301b and 301c are provided. These gages are arranged to engage spaced portions of the work piece during grinding. These gages are manually applied to the work at the start of the grinding operation. They are old and well known expedients in the grinding art and consequently have not been illustrated in detail.

The operation of the improved grinding machine truing apparatus will be readily apparent from the foregoing disclosure. When it is desired to simultaneously true all of the grinding wheels, it is preferably accomplished when the wheel slide 20 is in a rearward or inoperative position. In this position of the slide, with the grinding wheels rotating the control lever 113 is rocked in a counter-clockwise direction into dotted line position 113a (Fig. 8) so that fluid under pressure is passed through the pipe 105 into the cylinder chamber 106 to move the piston 96 toward the left (Fig. 8) thereby moving the cross slide 80 forward into an operative position. The push button switch 155 is then closed to start a truing cycle. The left hand contacts of limit switch LS2 being closed, the relay switch 156 is energized to close the contactors thereof thereby energizing the solenoid S1 to shift the valve member 132 toward the right so that fluid under pressure passing through the valve 130 passes through the pipe 138 to the motor 123 to rotate the feed screw 120 to start a traversing movement of the longitudinally movable slide 84 to traverse all of the truing tools 200, 201, 202 and 203 toward the right. At the same time the motor 123 is started, fluid under pressure is passed through the pipe 171 to actuate the feed compensator 165 which serves in a manner above described to impart a rotary motion to the screw 90 to advance the cross slide 80 by a predetermined amount for the truing operation. At the same time the compensator 165 imparts a rotary motion to the feed nut 36 to advance the wheel slide 20 through an equal distance so that after the truing operation, grinding may be resumed without resetting the wheel feeding mechanism.

The longitudinally movable slide 84 continues its movement toward the right at a speed governed by the throttle valves 139 and 141 simultaneously to traverse the truing tools across the faces of the grinding wheels 24, 25, 26 and 27. This movement continues until the stop lug 151 on the slide 84 engages and actuates the limit switch LS2. Opening the left hand contacts of the LS2 serves to deenergize the relay switch 156 thereby deenergizing the solenoid S1.

When the slide 84 starts its movement to the right the lug 150 moves away from the limit switch LS3 thereby opening the left hand contacts thereof and closing the right hand contacts thereof. Opening the left hand contacts of the limit switch LS3 opens a circuit to the relay switch 156 but due to the fact that the left hand contacts of the limit switch LS2 are closed the relay switch 156 remains energized. As the lug 150 moves away from the limit switch LS3, the right hand contacts thereof are closed to energize the relay switch 157 which in turn energizes the relay switch 158 and sets up a holding circuit so that the relay switches 157 and 158 remain energized after the right hand contacts of the limit switch LS2 are opened. As the slide 84 reaches the right hand end of its stroke the lug 151 shifts the limit switch LS2 to close the right hand contacts thereof which serves through the right hand contacts of the relay switch 158 to energize the solenoid S2 thereby shifting the valve member 132 toward the left so that fluid under pressure passes through the control valve 130 and through the pipe 142 to the motor 123 thereby imparting a rotary motion to the feed screw 120 in the reverse direction to start a traversing movement of the slide 84 toward the left. At the same time fluid is passed through the pipe 142, it is also passed through the pipe 170 to actuate the feed compensator 165 which in turn serves to impart a feeding movement to the cross slide 80 and an equal compensating feed to the wheel slide 20. The slide 84 continues its movement toward the left to pass the truing tools 200, 201, 202 and 203 across the peripheries of the grinding wheels 24, 25, 26 and 27 respectively to make a second truing thereof. The speed of movement of the truing tools during the truing operation on each of the passes may be varied as desired by regulating the throttle valves 139 and 141. The first pass may be at a slightly more rapid rate while the final pass may be made at a slower rate to produce the final truing of the wheels.

If it is desired to make more than two passes, that is, one complete reciprocation of the truing tools, this may be accomplished by again closing the start switch 155. Each time the switch 155 is closed, a single reciprocation of the slide 84 is provided. If it is desired to provide a continuous truing, that is, continuously reciprocate the truing tools for an indefinite number of passes, the continuous truing switch 159 may be closed which serves to close a circuit so that when the push button switch 155 is closed the slide 84 will be reciprocated continuously and the diamonds or truing tools reciprocated across the peripheries of the grinding wheels in a manner above described until the circuit is broken by opening the stop switch 160.

If during a grinding operation the operator observes by the dial gages that one of the wheels is grinding undersize, this means that either some of the wheels have worn away at a faster rate than the others or that one or more of the diamonds has worn away. In this case it may be desirable to compensate and to true one or more of the grinding wheels without returning the wheel slide 20 to a rearward position. This may be accomplished by shifting the lever 294 in a counter-clockwise direction into the broken line position 294a to shift the valve 293 so that the valve 296 is shifted to a by-pass position thereby stopping the infeeding movement of the wheel slide 20. When the wheel slide has stopped the grinding operation, one or more of the push button switches 274, 274a, 274b or 274c may be closed in a manner above described to incrementally advance one of the truing tools 200, 201, 202 or 203 after which the push button switch 155 may be closed to cause the truing tools to reciprocate across the peripheries of the wheels so that the oversized wheel or wheels may be trued to the proper size after which grinding may be resumed by again shifting the lever 294 into the full line position as indicated in Fig. 8. If more than one increment is required to reduce the oversized wheel by the desired amount, a second incremental feeding may be accomplished by again pressing one of the push button switches 274, 274a, 274b or 274c.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a grinding machine having a base, a transversely movable wheel slide thereon, a rotatable grinding wheel thereon, means to feed said slide transversely in a direction transverse to the wheel axis to facilitate grinding a work piece to a predetermined size, and a truing apparatus on said slide including a cross slide movable in a direction normal to the axis of the grinding wheel, means to move said cross slide in either direction, a longitudinally movable carriage on said cross slide movable in a direction parallel to the axis of the grinding wheel, means to traverse said carriage longitudinally in either direction parallel to the axis of the grinding wheel, an adjustable truing tool unit which is adjustable longitudinally relative to said carriage including a slidably mounted truing tool carrier on said unit arranged to move in a direction normal to the axis of the grinding wheel, a forming bar on said cross slide, a follower on said carrier, means to maintain said follower in engagement with said bar during longitudinal movement of the carriage, a truing tool on said carrier, and a feed mechanism interposed between the follower and carrier operatively connected to adjust the follower relative to the carrier so as to facilitate imparting a compensating adjustment to the truing tool.

2. In a grinding machine having a base, a transversely movable wheel slide thereon, a rotatable grinding wheel thereon, means to feed said slide transversely in a direction transverse to the wheel axis to facilitate grinding a work piece to a predetermined size, and a truing apparatus on said slide including a cross slide movable in a direction normal to the axis of the grinding wheel, means to move said cross slide in either direction, a longitudinally movable carriage on said cross slide movable in a direction normal to the cross slide, means to traverse said carriage longitudinally in either direction parallel to the axis of the grinding wheel, a longitudinally adjustable truing tool unit on said carriage including a slidably mounted truing tool carrier on said unit arranged to move in a direction normal to the axis of the grinding wheel, a forming bar on said cross slide, a follower on said carrier, means to maintain said follower in engagement with said bar during longitudinal movement of the carriage, a truing tool on said carrier, a feed mechanism interposed between the follower and carrier operatively connected to adjust the follower relative to the carrier, and a remote control means operatively connected to actuate said feed mechanism to facilitate imparting an incremental compensating adjustment to the truing tool.

3. In a grinding machine for grinding a plurality of spaced portions on a work piece having a base, a transversely movable wheel slide thereon, a plurality of spaced rotatable grinding wheels thereon, means to feed said slide transversely in a direction transverse to the wheel axis simultaneously to grind a plurality of spaced portions on a work piece to a predetermined size, and a truing apparatus on said slide including a cross slide movable in a direction normal to the axis of the grinding wheel, means to move said cross slide in either direction, a longitudinally movable carriage on said cross slide which is movable in a direction parallel to the wheel axis, means to traverse said carriage longitudinally in either direction parallel to the axis of the grinding wheel, a plurality of longitudinally adjustable truing tool units on said carriage each including a slidably mounted truing tool carrier arranged to move in a direction normal to the axis of the grinding wheel, a forming bar on said cross slide, a follower on each of said carriers, means to maintain said followers in operative engagement with said forming bar during longitudinal movement of the carriage, a truing tool on each of said carriers, and an independent feeding mechanism on each of said units interposed between the follower and carrier operatively connected to adjust the followers relative to the carriers to facilitate imparting an independent compensating adjustment to each of the truing tools.

4. In a grinding machine for grinding a plurality of spaced portions on a work piece having a base, a transversely movable wheel slide thereon, a plurality of spaced rotatable grinding wheels thereon, means to feed said slide transversely in a direction transverse to the wheel axis simultaneously to grind a plurality of spaced portions on a work piece to a predetermined size, and a truing apparatus on said slide including a cross slide movable in a direction normal to the axis of the grinding wheel, means to move said cross slide in either direction, a longitudinally movable carriage on said cross slide movable in a direction normal to said cross slide, means to traverse said carriage longitudinally in either direction parallel to the axis of the grinding wheel, a plurality of longitudinally adjustable truing tool units on said carriage each including a slidably mounted truing tool carrier arranged to move in a direction normal to the axis of the grinding wheels, a forming bar on said cross slide, a follower adjustably mounted on each of said carriers, means to maintain said followers in operative engagement with said forming bar during longitudinal movement of the carriage, a truing tool on each of said carriers, an independent feeding mechanism on each of said units interposed between the follower and carrier operatively connected to adjust the follower relative to the carrier, and remote control means operatively connected to actuate said feed mechanisms to facilitate imparting an independent compensating adjustment to each of said truing tools.

5. In a grinding machine as claimed in claim 1, in combination with the parts and features therein specified in which said feeding mechanism includes a nut and screw interposed between the follower and carrier, a pawl and ratchet mechanism operatively connected to rotate said feed screw, and a hydraulic piston and cylinder to actuate said pawl and ratchet mechanism so as to impart a compensating adjustment to the nut and screw mechanism.

6. In a grinding machine, as claimed in claim 3, in combination with the parts and features therein specified in which each of said feeding mechanisms includes a nut and screw interposed between each of the followers and carriers, an independent pawl and ratchet mechanism operatively connected to rotate each of said feed screws, and an independent hydraulic piston and cylinder to actuate each of said pawl and ratchet mechanisms so as to impart an independent compensating adjustment to each of said nut and screw mechanisms.

7. In a grinding machine as claimed in claim 3, in combination with the parts and features therein specified of means including a feed compensator mechanism, operative connections between said compensator and said truing tool feeding mechanism, operative connections between said compensator and said wheel slide feeding means, and a manually operable control for said compensator whereby actuation of said compensator serves to impart a feeding movement to the truing tool slide and simultaneously to impart a compensating adjustment of the wheel feeding mechanism.

8. In a grinding machine as claimed in claim 1, in combination with the parts and features therein specified in which the feeding mechanism includes a nut and screw between the follower and carrier, a pawl and ratchet mechanism on said carrier operatively connected to rotate said feed screw, a hydraulic piston and cylinder on said carrier to actuate said pawl and ratchet to impart a predetermined compensating adjustment to the nut and screw mechanism, and means including an adjustable stop screw to limit the movement of said piston to facilitate varying the extent of the compensating adjustment.

9. In a grinding machine as claimed in claim 3, in combination with the parts and features therein specified in which the feeding mechanism on each of said units includes a nut and screw between the follower and carrier, an independent pawl and ratchet mechanism on each of said carriers operatively connected to rotate said feed screws, an independent hydraulic piston and cylinder on each of said carriers independently to actuate said pawl and ratchet mechanisms to impart a predetermined compensating adjustment to the nut and screw mechanisms, and means including an independent adjustable stop screw for limiting the movement of each of said pistons to facilitate independently varying the extent of the compensating adjustment of each of the truing tools.

10. In a grinding machine as claimed in claim 1, in combination with the parts and features therein specified in which said feeding mechanism includes a nut and screw interposed between the follower and carrier, a pawl and ratchet mechanism on said carrier operatively connected to rotate said feed screw, a piston and cylinder to actuate said pawl and ratchet mechanism so as to impart a predetermined compensating adjustment to the nut and screw mechanism, means including an adjustable stop screw for limiting the movement of said piston to facilitate varying the extent of the compensating adjustment, a remote control therefor including a solenoid-actuated control valve for controlling the admission to and exhaust of fluid from said cylinder, and a push button switch operatively connected to control actuation of said valve.

11. In a grinding machine as claimed in claim 3, in combination with the parts and features therein specified in which said feeding mechanisms on each of said units includes a nut and screw interposed between the follower and carrier, a pawl and ratchet mechanism on each of said carriers operatively connected to rotate said feed screw, an independent piston and cylinder to actuate each of said pawl and ratchet mechanisms so as to impart a predetermined compensating adjustment to the nut and screw mechanisms, means including an independent adjustable stop screw for limiting the movement of each of said pistons to facilitate varying the extent of the compensating adjustment, a remote control therefor including an independent solenoid-actuated control valve for controlling the admission to and exhaust of fluid from each of said cylinders, and an independent manually operable switch operatively connected to control actuation of each of said valves.

12. In a grinding machine as claimed in claim 3, in combination with the parts and features therein specified of an independent visible gage for each portion of the work piece being ground, a nut and screw mechanism to feed said wheel slide, a piston and cylinder operatively connected to rotate said feed screw, a control valve therefor operatively connected to control the admission to and exhaust of fluid from said cylinder, and means including a manually operable valve operatively connected to stop the infeed during a grinding operation when the gages indicate wheel wear to facilitate a grinding wheel truing operation.

*13. In a grinding machine for grinding a plurality of spaced portions on a work piece having a base, a transversely movable wheel slide thereon, a plurality of spaced rotatable grinding wheels thereon, means to feed said slide transversely in a direction transverse to the axis of the wheels simultaneously to grind a plurality of spaced portions on a work piece to a predetermined size, and a truing apparatus on said slide including a cross slide movable in a direction normal to the axis of the grinding wheels, means to move said cross slide in either direction, a longitudinally movable carriage on said cross slide movable in a direction normal to said cross slide, means to traverse said carriage longitudinally in either direction parallel to the axis of the grinding wheels, a plurality of longitudinally adjustable truing tool units on said carriage each including a slidably mounted truing tool carrier arranged to move in a direction normal to the axis of the grinding wheels, a truing tool on each of said carriers, an independent feeding mechanism on each of said units interposed between the longitudinally movable carriage and carrier operatively connected to adjust the carrier relative to the longitudinally movable carriage, and remote control means operatively connected to actuate said feed mechanisms to facilitate imparting an independent compensating adjustment to each of said truing tools.*

References Cited in the file of this patent or the original patent

UNITED STATES PATENTS

| | | |
|---|---|---|
| 2,004,426 | Booth | June 11, 1935 |
| 2,117,979 | Ogilvie | May 17, 1938 |
| 2,150,091 | Alvord | Mar. 7, 1939 |
| 2,310,977 | Mathys | Feb. 16, 1943 |
| 2,335,207 | Flygare | Nov. 23, 1943 |
| 2,576,239 | Reimschissel | Nov. 27, 1951 |
| 2,597,242 | Hill | May 20, 1952 |